United States Patent
Murray, Jr. et al.

(10) Patent No.: US 11,366,033 B2
(45) Date of Patent: Jun. 21, 2022

(54) CRASH PRESSURE SENSOR WITH IMPROVED FLUID COMMUNICATION

(71) Applicant: ZF ACTIVE SAFETY AND ELECTRONICS US LLC, Livonia, MI (US)

(72) Inventors: Neil G. Murray, Jr., Wixom, MI (US); Mark Ramsay, Livonia, MI (US)

(73) Assignee: ZF ACTIVE SAFETY AND ELECTRONICS US LLC, Livonia, MI (US)

(*) Notice: Subject to any disclaimer, the term of this patent is extended or adjusted under 35 U.S.C. 154(b) by 0 days.

(21) Appl. No.: 17/053,082

(22) PCT Filed: Jun. 19, 2018

(86) PCT No.: PCT/US2018/038154
§ 371 (c)(1),
(2) Date: Nov. 5, 2020

(87) PCT Pub. No.: WO2019/245527
PCT Pub. Date: Dec. 26, 2019

(65) Prior Publication Data
US 2021/0072106 A1    Mar. 11, 2021

(51) Int. Cl.
*G01L 19/00*    (2006.01)
*B60J 5/04*    (2006.01)
*G01L 19/14*    (2006.01)
*B60R 21/013*    (2006.01)

(52) U.S. Cl.
CPC ......... *G01L 19/0084* (2013.01); *B60J 5/0468* (2013.01); *G01L 19/0038* (2013.01); *G01L 19/14* (2013.01); *G01L 19/147* (2013.01); *B60R 21/013* (2013.01)

(58) Field of Classification Search
None
See application file for complete search history.

(56) References Cited

U.S. PATENT DOCUMENTS

| | | |
|---|---|---|
| 5,184,107 A | 2/1993 | Maurer |
| 5,351,550 A | 10/1994 | Maurer |
| 5,763,787 A | 6/1998 | Gravel et al. |
| 7,162,927 B1 | 1/2007 | Selvan et al. |
| 2016/0061682 A1 | 3/2016 | Ramsay |

*Primary Examiner* — Lisa M Caputo
*Assistant Examiner* — Nigel H Plumb
(74) *Attorney, Agent, or Firm* — Tarolli, Sundheim, Covell & Tummino LLP

(57) ABSTRACT

A pressure sensor for being mounted in a vehicle door includes a housing, a pressure transducer, an elastomeric connector, and electrical conductors for facilitating an electrical connection to the pressure sensor. The pressure transducer is mounted in the housing adjacent the elastomeric connector. The housing is configured to exert a force that presses the pressure transducer against the elastomeric connector. The elastomeric connector comprises electrically conductive regions configured to be pressed against electrical contacts of the pressure transducer and the electrical conductors to establish and maintain an electrical connection between the pressure transducer and the electrical conductors.

20 Claims, 7 Drawing Sheets

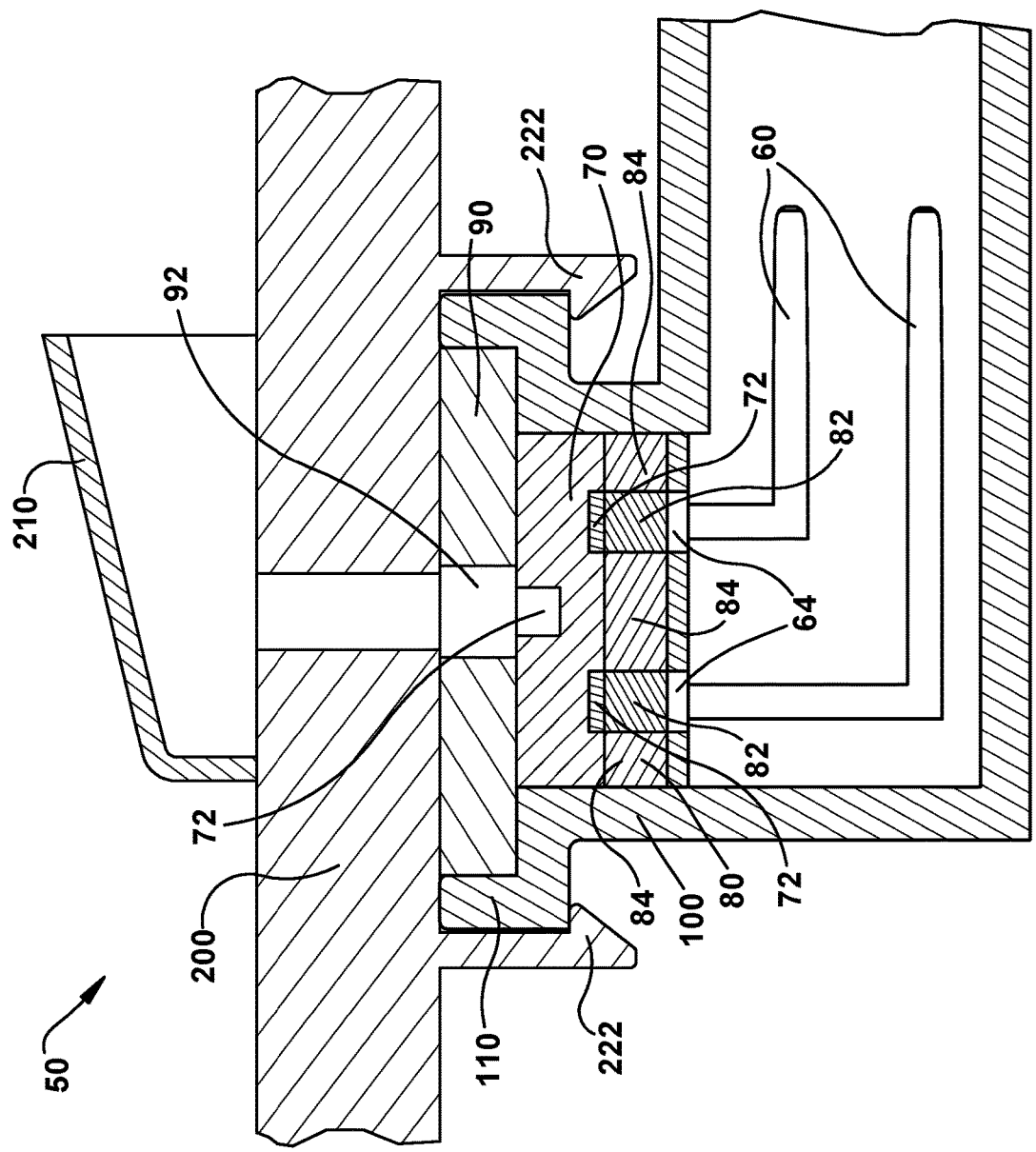

CRASH PRESSURE SENSOR WITH IMPROVED FLUID COMMUNICATION

CROSS REFERENCES TO RELATED APPLICATIONS

This application filed under 35 U.S.C § 371 is a national phase application of International Application Serial Number PCT/US2018/038154 filed Jun. 19, 2018, the subject matter of which is incorporated herein by reference in its entirety.

FIELD OF THE INVENTION

The present invention is directed to vehicle crash sensors and is more particularly directed to a crash pressure sensor for being mounted in a vehicle door.

BACKGROUND OF THE INVENTION

Vehicle occupant protection systems can include one or more vehicle occupant protection devices, such as airbags, that are actuatable (e.g., inflatable) to help protect vehicle occupant(s) upon the occurrence of an event for which occupant protection is desired, such as a crash or collision. The protection system can also include a controller for controlling the actuation of the protection devices, and one or more sensors for monitoring vehicle conditions and providing a signal indicative of those conditions to the controller. The controller is configured to detect the occurrence of an event for which occupant protection is desired in response to the signal(s) provided by the sensor(s). When the controller detects the occurrence of such an event, it can actuate the vehicle occupant protection device(s) to help protect the occupant(s) of the vehicle.

Vehicle crash sensors can include mechanical devices, such as switches, that close in response to deformation of the vehicle or a sudden deceleration of the vehicle. The closure of the mechanical device causes a signal indicative of these sensed conditions to the controller, which can use these conditions to determine the occurrence of a vehicle crash condition. The controller can actuate the protection device(s) in response to this determination.

Other vehicle crash sensors can include electrical devices, such as transducers, that are configured to sense a vehicle condition and provide an output signal commensurate with that sensed condition. For example, an accelerometer can be configured to sense vehicle acceleration in different directions and can provide to the controller a signal commensurate with the sensed acceleration in the assigned directions. When the controller determines that the signal from the sensor reaches or crosses a threshold level, it can determine the occurrence of a vehicle crash condition and actuate the protection device(s).

Vehicle crash sensors for detecting a side impact to a vehicle must have particularly rapid response times. This is because the time period within which a side impact protection device must be deployed is significantly less than the time period within which other protection devices, such as frontal protection devices, must be deployed. To help improve the response time of a vehicle crash sensor for sensing side impacts, it is common to locate the vehicle crash sensor at a side location of the vehicle, such as within a side door of the vehicle.

Door-mounted side impact crash sensors can include accelerometers that detect lateral vehicle movements indicative of a side impact event, and pressure sensors that detect side impacts in response to pressure changes within the vehicle door. In the latter instance, since the door interior is essentially a closed space, air pressure within the door responds rapidly to door deformation resulting from a side impact event. The controller can receive pressure signals from the side impact pressure sensors, determine the occurrence of a side impact crash condition in response to those signals, and actuate the side impact protection device(s) accordingly.

SUMMARY OF THE INVENTION

According to one aspect, a vehicle safety system includes one or more vehicle occupant protection devices, a controller for controlling actuation of the protection device(s), and a vehicle door-mounted pressure for sensing pressure changes in the door and providing a signal indicative of the sensed pressure changes to the controller. The pressure sensor is exposed to the cavity within the door and can therefore can use the entire vehicle door, or a substantial portion thereof, as a sensing area. This allows the sensor to be robust to a variety of crash scenarios, including pole crashes and crashes that impact areas high on the door, such as SUV collisions, and low on the door, such as guardrail collisions.

According to another aspect, alone or in combination with any other aspect, a pressure sensor for being mounted in a vehicle door includes a housing, a pressure transducer, an elastomeric connector, and electrical conductors for facilitating an electrical connection to the pressure sensor. The pressure transducer is mounted in the housing adjacent the elastomeric connector. The housing can be configured to exert a force that presses the pressure transducer against the elastomeric connector. The elastomeric connector includes electrically conductive regions configured to be pressed against electrical contacts of the pressure transducer and the electrical conductors to establish and maintain an electrical connection between the pressure transducer and the electrical conductors.

According to another aspect, alone or in combination with any other aspect, the elastomeric connector can include electrically insulating regions adjacent the electrically conductive regions. The electrically insulating regions can help to electrically isolate the electrical contacts of the pressure transducer and the electrical conductors from each other and from any surrounding electrically conductive structures.

According to another aspect, alone or in combination with any other aspect, the pressure sensor can also include a gasket. The pressure transducer can be mounted in the housing between the gasket and the elastomeric connector. The force exerted by the housing can act on the gasket and compress the pressure transducer between the gasket and the elastomeric connector.

According to another aspect, alone or in combination with any other aspect, the housing can include an inlet port that provides fluid communication between an interior of the housing and an exterior of the housing. The gasket can include an opening that exposes the pressure transducer to air pressure external to the pressure sensor.

According to another aspect, alone or in combination with any other aspect, the housing can be configured to be mounted on a door panel within the vehicle door to position the inlet port on a wet side of the door and the electrical conductors on a dry side of the door.

According to another aspect, alone or in combination with any other aspect, the pressure sensor isolates the wet side of the door from the dry side of the door.

According to another aspect, alone or in combination with any other aspect, the pressure transducer and the elastomeric connector can be at least partially positioned in a recess of a sensor housing portion of the housing. The pressure transducer can have an upper surface against which the gasket is positioned, an opposite lower surface against which the elastomeric connector is positioned, and a peripheral edge positioned adjacent a wall of the housing defining the recess. The gasket, elastomeric connector, and sensor housing portion can surround the pressure transducer on all sides with the exception of a sensing portion of the transducer that is exposed to the exterior of the sensor via an opening in the gasket.

According to another aspect, alone or in combination with any other aspect, the gasket, elastomeric connector, and sensor housing portion can define a water-tight seal around the pressure transducer.

According to another aspect, alone or in combination with any other aspect, the housing can include a body portion including a sensor housing portion and an electrical connector portion. The housing can also include a disc portion including a disc-shaped main portion and an inlet port that extends from a first side of the main portion. The sensor housing portion can include a recess for receiving the pressure transducer, the elastomeric connector, and the gasket. The disc portion can be connectable to the body portion via a snap-fit connection that places the pressure transducer in fluid communication with an exterior of the housing via an opening in the gasket and the inlet port.

According to another aspect, alone or in combination with any other aspect, the snap-fit connection between the body portion and disc portion can cause the force to be exerted on the gasket.

According to another aspect, alone or in combination with any other aspect, the snap-fit connection between the body portion and disc portion can be facilitated by retainer tabs on the disc portion that snap onto the body portion.

According to another aspect, alone or in combination with any other aspect, the housing can also include a base ring portion comprising an annular wall and a base wall that spans a portion of the interior space defined by the annular wall. The base wall can include an opening shaped and sized to receive the inlet port of the disc portion, a first extension that shields the inlet port, and a second extension that shields the electrical connector portion. The base ring portion can be configured to have a snap-fit connection with the disc portion. The base ring portion can be configured to facilitate connecting the pressure sensor to the vehicle door.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIG. 8 is a schematic sectional view illustrating the arrangement of components in the pressure sensor.

DETAILED DESCRIPTION

Figure 1:
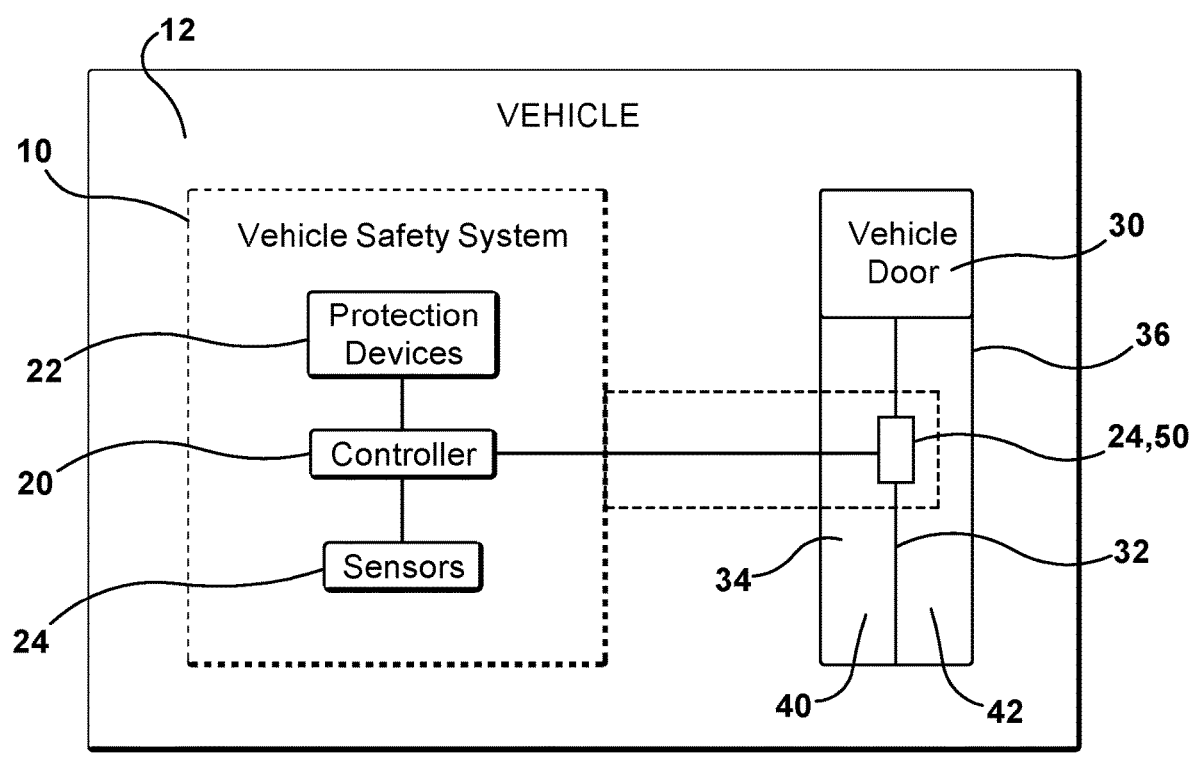
FIG. 1 is a block diagram illustrating a vehicle safety system.
Figure 2:
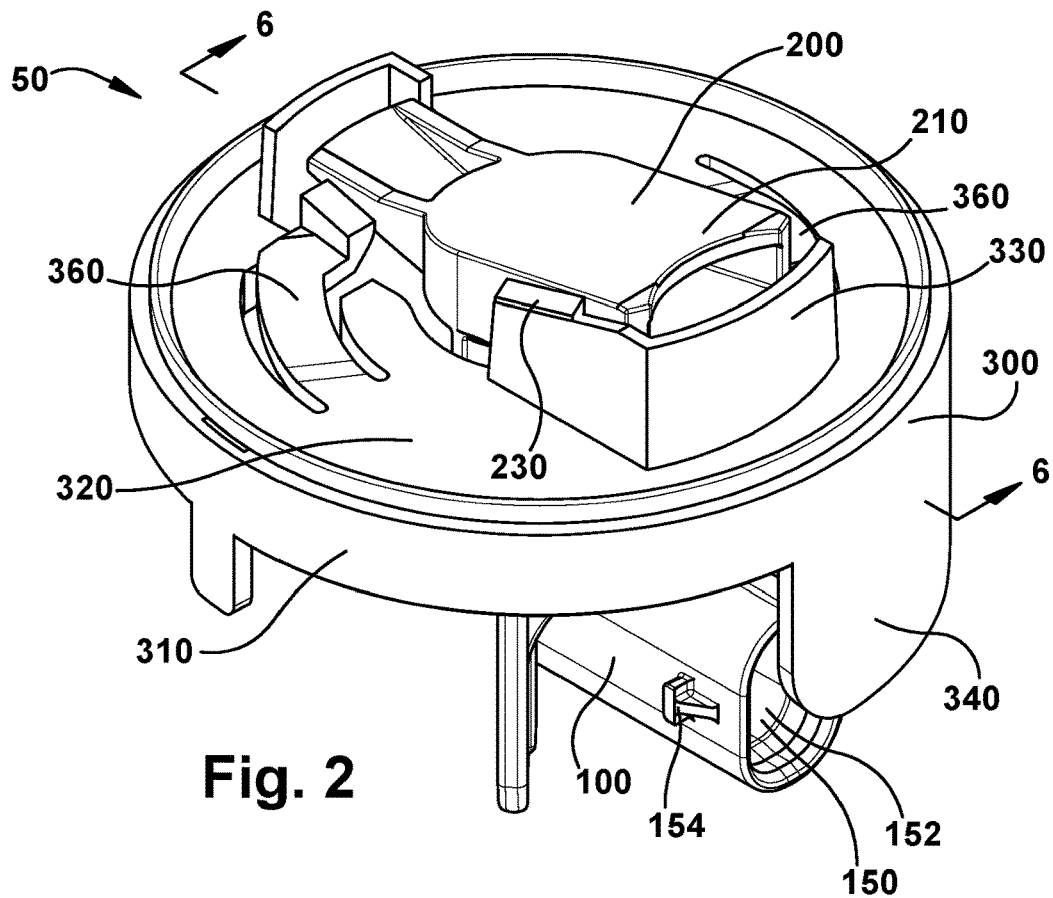
FIG. 2 is a first perspective view illustrating an example configuration of a crash pressure sensor that forms part of the vehicle safety system.

Referring to FIG. 1, a vehicle 12 includes a vehicle safety system 10. The vehicle safety system 10 includes a controller 20 that is operatively connected to protection devices 22, such as airbags. The controller 20 is also operatively connected to sensors 24 configured to sense various vehicle and/or occupant conditions and transmit signals representative of those sensed conditions to the controller. The controller 20 is configured to interpret the sensed conditions in order to determine the occurrence of an event for which occupant protection is desired, such as a vehicle impact or collision, referred to herein as a "vehicle crash condition." The controller 20 is further configured to actuate the protection devices 22 in response to determining the vehicle crash condition.

As shown in FIG. 1, the sensors 24 include a sensor that is mounted in a vehicle door 30. This sensor is a pressure sensor 50 for detecting vehicle crash conditions in response to pressure changes in the vehicle door 30 resulting from impacts to the door. As shown, the pressure sensor 50 is mounted to internal structure, referred to herein as a door panel 32, in an interior area 34 of the door 30. The door panel 32 divides the interior area 34 and helps define a dry side 40 and a wet side 42 of the door 30. The pressure sensor 50 has a portion positioned on the dry side 40 of the vehicle door 30 and a portion positioned on the wet side 42 of the door.

As the name implies, the dry side 40 of the door 30 is sealed-off from the environmental conditions so as to remain dry or substantially dry. Similarly, the wet side 42 of the door 30 may be subjected to environmental conditions that allow moisture e.g., rain, to be present in that side of the door. To position certain portions of the pressure sensor 50 on the dry side 40 and other portions of the sensor on the wet side 42, the sensor can be configured to be connected in an opening in the door panel 32. This connection can, for example, be achieved via a press-in, snap-fit connection or an insert-to-engage and rotate or twist-to-lock connection. The connection between the pressure sensor 50 and the door panel 32 can be water-tight so as to maintain the integrity of the dry side 40 and wet side 42 of the door 30.

During a crash event in which the vehicle door 30 is impacted, the pressure sensor 50 measures the change in air pressure in the interior area 34. An impact with the door 30 would deform an outboard door panel 36 inboard into the interior space 34, and this decrease in volume of the interior space would result in an increase in air pressure. It is this increase in air pressure that the pressure sensor 50. The pressure sensor 50 provides a signal to the controller 20 commensurate with the magnitude of the sensed pressure. The controller 20 can use the signal from the pressure sensor 50 to help determine the vehicle crash condition.

Referring to FIGS. 2-5, the pressure sensor 50 includes a body portion 100 (hereafter "body 100"), a disc portion 200 (hereafter "disc 200"), and a base ring portion 300 (hereafter "base ring 300"). The body 100, disc 200 and base ring 300 are connectable to each other to define a housing of the pressure sensor 50. The pressure sensor 50 also includes electrical connectors or conductors in the form of terminal pins 60, a pressure transducer 70, an elastomeric connector 80, and a gasket 90, which are installed in the housing, specifically in the body portion 100. The pressure transducer 70 can, for example, be an application specific integrated circuit ("ASIC") specifically designed for pressure sensing applications. In the assembled condition of the pressure sensor 50, the body 100, disc 200 and base ring 300 are connected to each other, with the terminal pins 60, pressure transducer 70, elastomeric connector 80, and gasket 90 installed therein.

The body 100 has a molded plastic construction and includes a sensor housing portion 110 and an electrical connector portion 150. The sensor housing portion 110 has a recess 112 for supporting the pressure transducer 70, elastomeric connector 80, and gasket 90. The electrical connector portion 150 includes a shroud 152 that houses the terminal pins 60. In the illustrated example configuration, the shroud 152 is a female connector portion that receives a male connector (not shown). The male connector can terminate wires used to transmit signals from the pressure sensor 50 to the controller 20 (see FIG. 1). To maintain the mechanical connection with the male connector, the shroud 152 can include locking tabs 154.

The disc 200 has a molded plastic construction and includes a flat, circular, disc-shaped main portion 202. An inlet port 210 extends from a first side 204 of the main portion 202. A series of retainer tabs 220 extend from an opposite second side 206 of the main portion 202. The retainer tabs 220 receive the sensor housing portion 110 of the body 100. The retainer tabs 220 include retention hooks 222 that slide over and snap onto a shoulder portion 120 of the sensor housing portion 110 to connect the body 100 to the disc 200.

The base ring 300 has a molded plastic construction and has a generally cylindrical or ring-shaped configuration. The base ring 300 includes a cylindrical annular wall 310 and a base wall 320 that spans a portion of the interior space defined by the annular wall. The base wall 320 includes an opening 322 shaped and sized to receive the inlet port 210 of the disc 200. The base ring 300 includes a first extension 330 that shields the inlet port 210 to help block water from entering and interfering with the electronics of the sensor 50. The base ring 300 also includes a second extension 340 that shields the electrical connector portion 150 of the body 100.

The base ring 300 also includes retainer structures 360 positioned on opposite sides of the opening 322. The retainer structures 360 have ramp-like configurations and are configured to help retain the pressure sensor 50 when mounted to the vehicle door 30, particularly to the door panel 32.

Figure 7A:
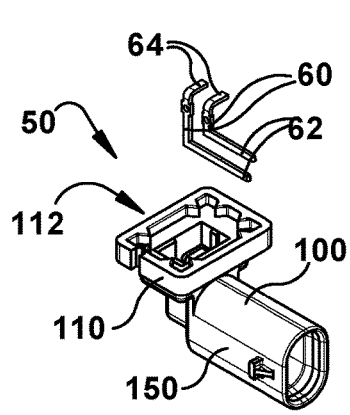
FIGS. 7A-7F illustrate the assembly of the pressure sensor.

Assembly of the pressure sensor 50 is illustrated in FIGS. 7A-7F. Referring to FIG. 7A, the first step in the assembly of the pressure sensor 50 is to install the terminal pins 60 in the body 100. To do this, the terminal pins 60 are inserted into the sensor housing portion 110 of the body 100 so that connector portions 62 of the pins are positioned in the electrical connector portion 150, leaving contact portions 64 exposed in the recess 112 of the sensor housing portion 110.

Figure 7B:
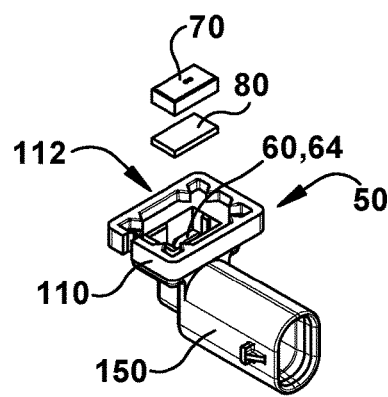
Figure 7C:
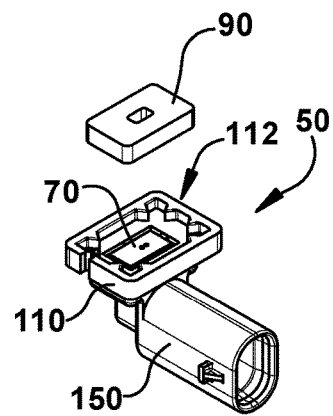

Next, referring to FIG. 7B, the elastomeric connector 80 is installed in the recess 112 of the sensor housing portion 110 so that the connector engages the exposed contact portions 64 of the terminal pins 60. The pressure transducer 70 is then installed in the recess 112 so that the pressure transducer engages the elastomeric connector 80. Next, referring to FIG. 7C, the gasket 90 is installed in the recess 112 so that it engages the pressure transducer 70.

Figure 3:
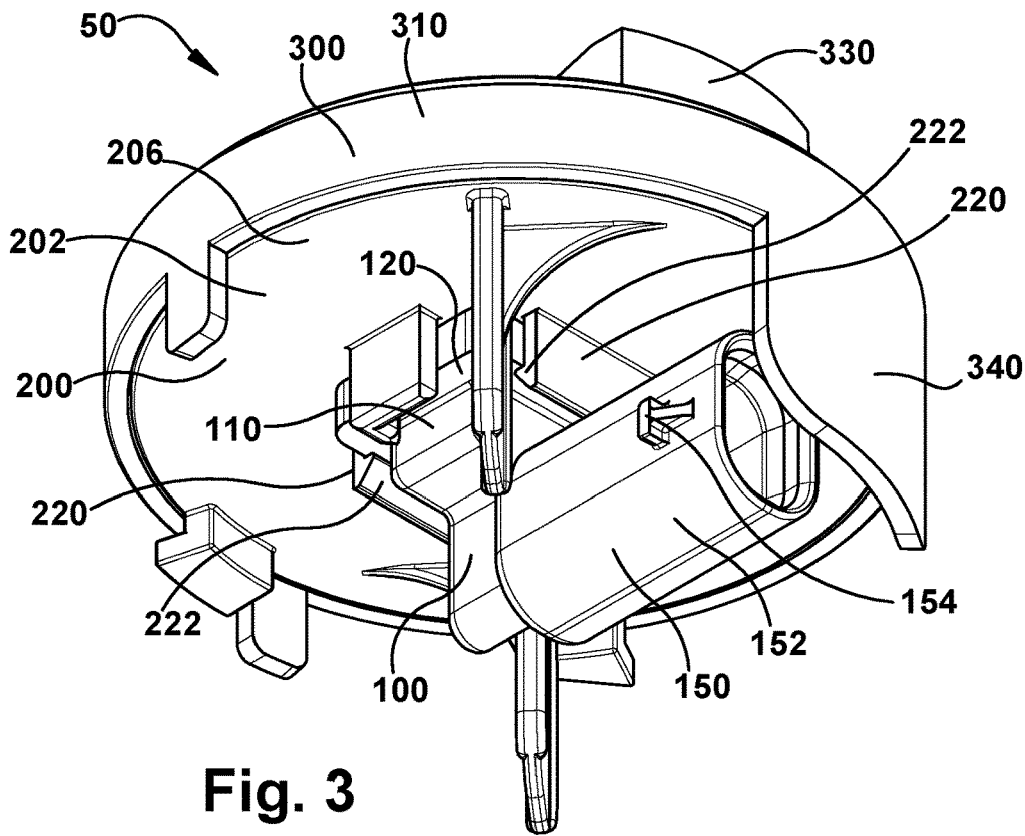
FIG. 3 is a second perspective view of the pressure sensor.
Figure 4:
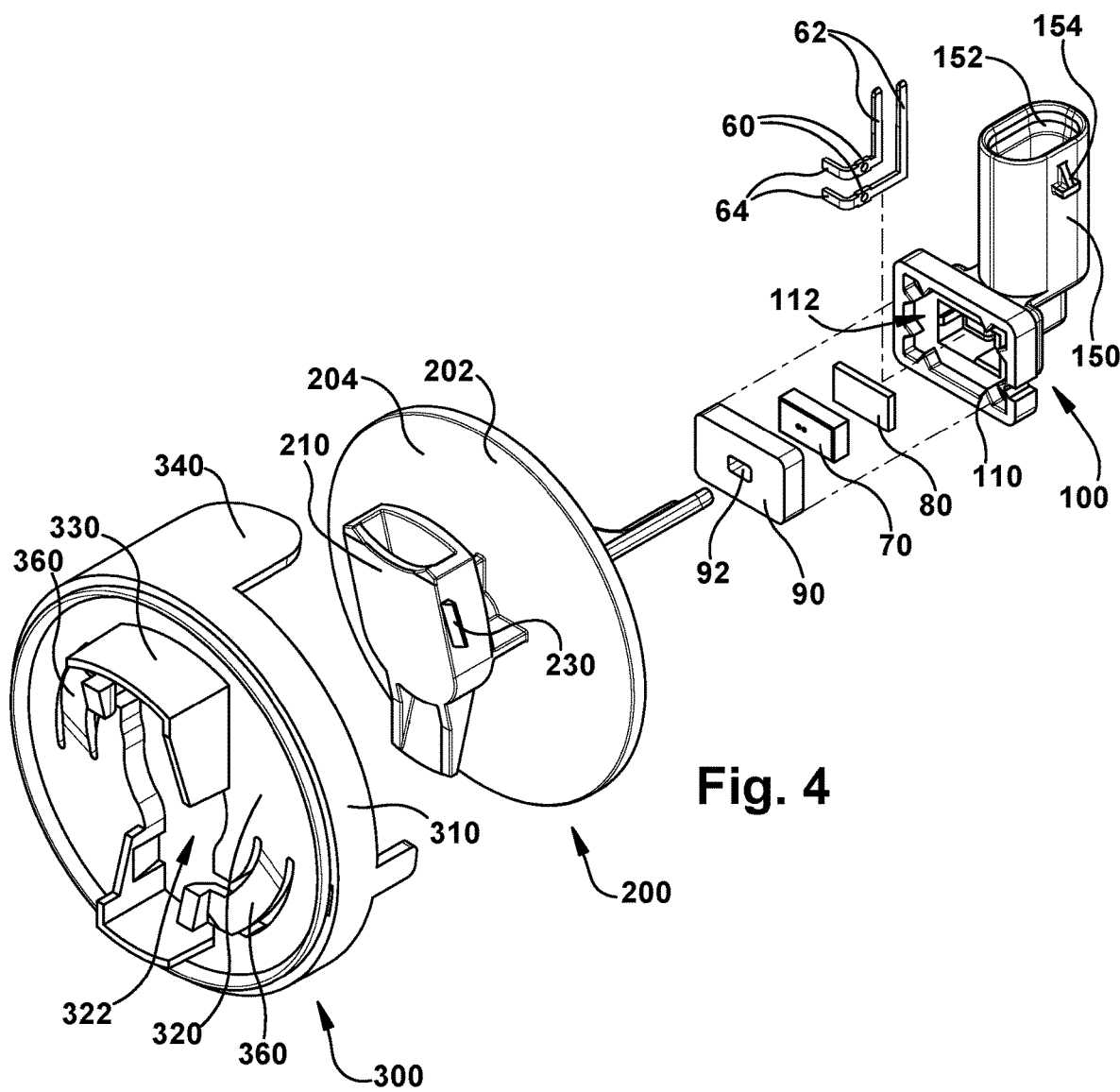
FIG. 4 is a first exploded view of the pressure sensor.
Figure 5:
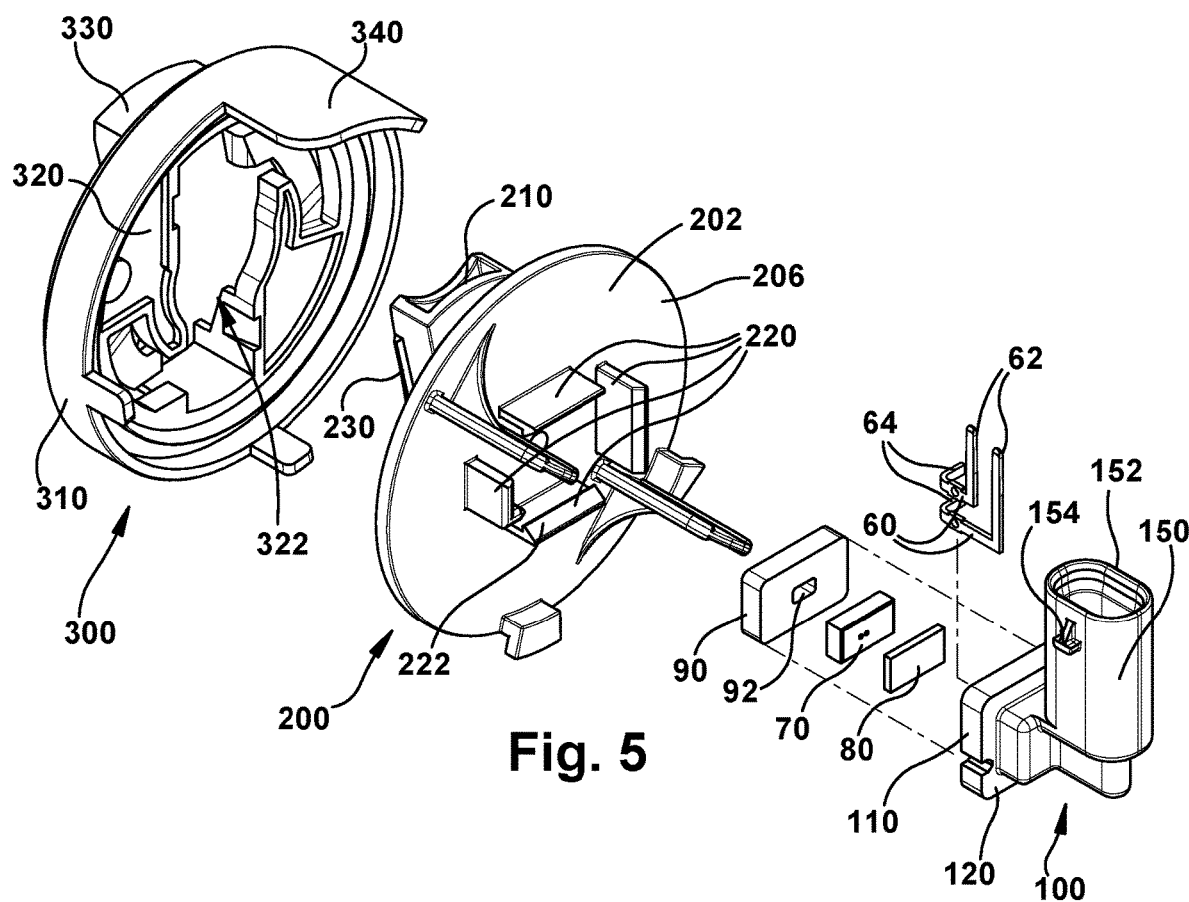
FIG. 5 is a second exploded view of the pressure sensor.
Figure 7D:
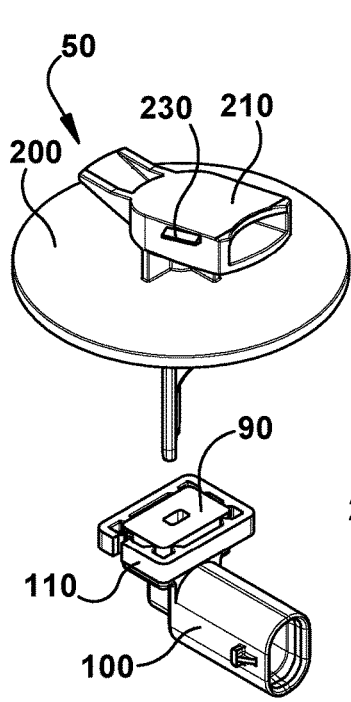
Figure 7E:
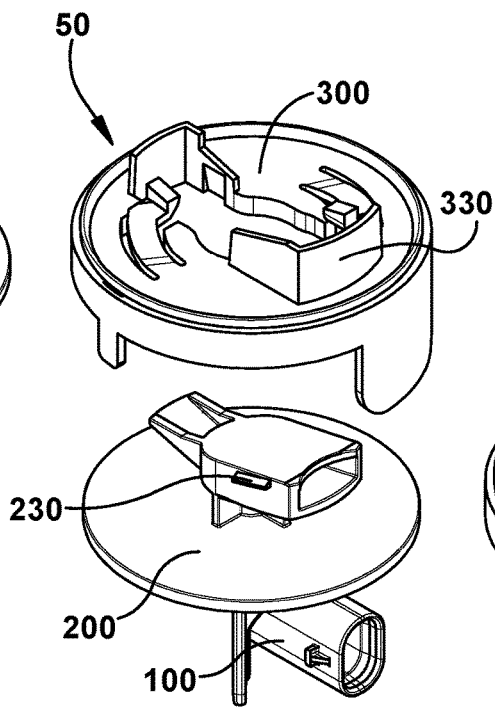
Figure 7F:
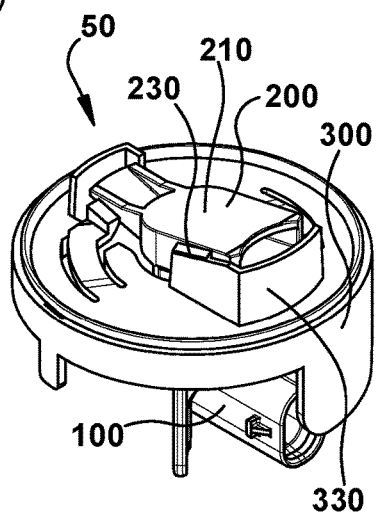

Next, referring to FIG. 7D, the disc 200 is installed onto the body 100 so that the retainer tabs 220 slide over the sensor housing portion 110 and the retention hooks 222 snap onto the shoulder portion 120 (see, e.g., FIG. 3). The retainer tabs 220 connect the body 100 to the disc 200. Next, referring to FIG. 7E, the base ring 300 is installed and connected to the assemblage of the body 100 and disc 200. In the example configuration, this connection is formed at least partially by a retention hook 230 that snaps over the first extension 330 of the base ring 300. This completes the assembly of the pressure sensor 50, as shown in FIG. 7F.

Advantageously, the pressure sensor 50 is configured such that the assembly of its components, as described with reference to FIGS. 7A-7F, completes the construction, both mechanically and electrically. The configuration of the pressure sensor 50 eliminates the need for traditional electrical connections, such as solder or compliant pins, which facilitates rapid assembly, either by hand or by automation, i.e., robots. There are several components that facilitate this construction.

Figure 6:
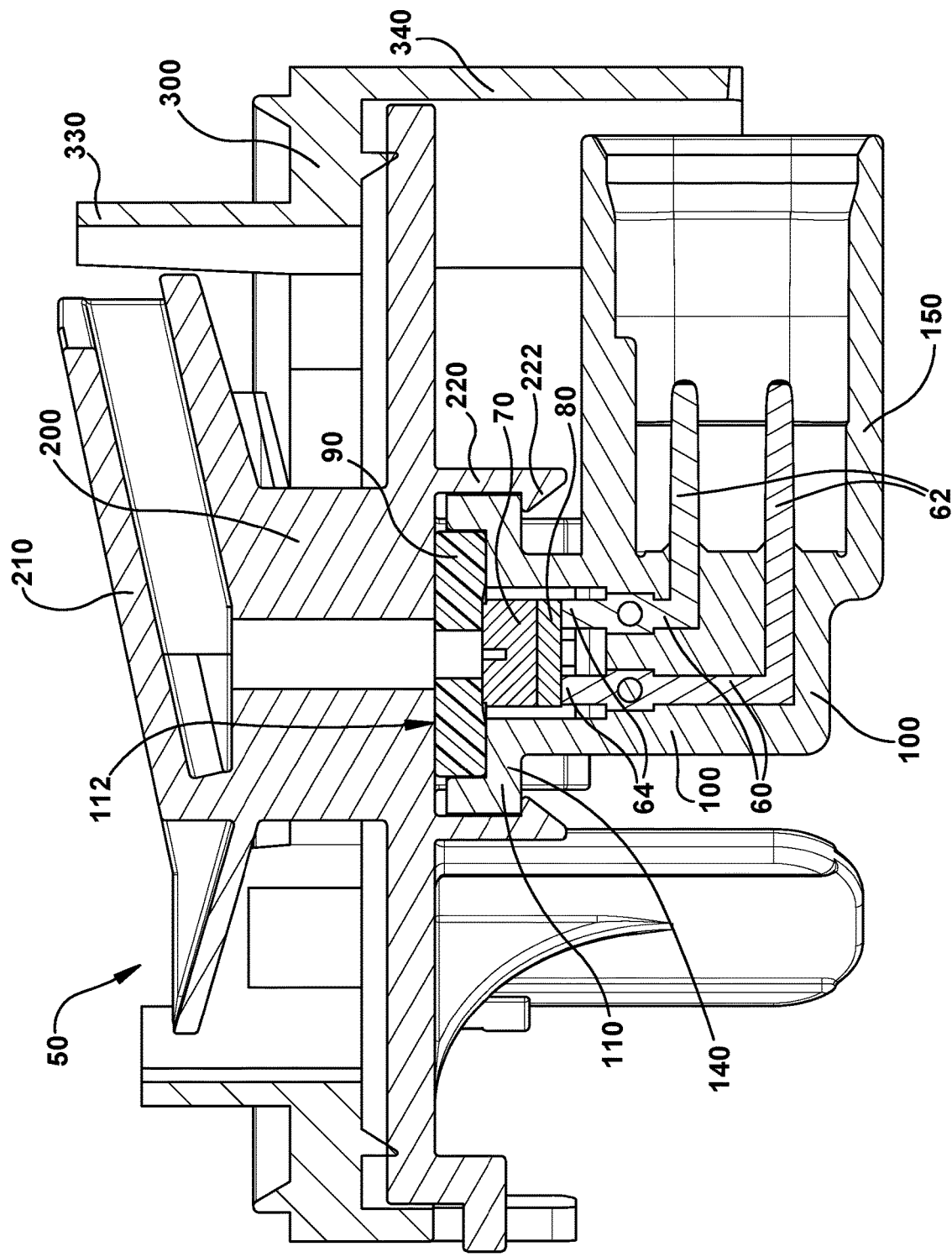
FIG. 6 is a sectional view of the crash pressure sensor assembly taken generally along line 6-6 in FIG. 2.

Referring to FIG. 6, in the assembled condition, the pressure transducer 70 is sandwiched between the gasket 90 and the elastomeric connector 80. The gasket 90 is constructed of an elastomeric material, such as silicone, and has a thickness selected such that, when the disc 200 is connected to the body 100, the gasket 90 deforms in the recess 112 of the sensor housing portion 110. The elastomeric gasket 90, when deformed, is pressed against the pressure transducer 70, which is pressed against the elastomeric connector 80. This pressing force is transferred through the elastomeric connector 80, which is pressed against the contact portions 64 of the terminal pins 60.

The elastomeric gasket 90 ensures that firm physical contact between the pressure transducer 70, the elastomeric connector 80, and terminal pins 60 is maintained. Advantageously, this firm contact facilitates a robust, reliable electrical connection between the 70 and the terminal pins 60 that facilitates electrical communication between the pressure sensor 50 and the controller 20. This electrical connection is brought about by the construction of the elastomeric connector 80.

Referring to FIG. 8, the elastomeric connector 80 includes electrically conductive regions 82 and electrically insulating regions 84. These connectors are commercially available and are sometimes referred to as "Zebra" connectors, which is a registered trademark of the Fuji Polymer Industries Co., Ltd. of Japan. The electrically conductive regions 82 extend through the thickness of the connector 80 and are configured and arranged to physically contact electrical contacts 72 of the pressure transducer 70 and the contact portions 64 of the terminal pins 60. The elastomeric connector 80 thus establishes and maintains electrical contact between the pressure transducer 70 and the terminal pins 60. The insulating regions 84 of the connector 80 help electrically isolate the terminal pins 60 and pressure transducer 70 from surrounding structures.

Because the elastomeric connector 80 is formed in large part of an elastomeric material, such as silicone, it can also serve as a seal for helping to isolate the pressure transducer 70 from the environment. The pressure transducer 70 is thus sandwiched between two elastomeric bodies (gasket 90 and connector 80) and surrounded by the plastic sensor housing portion 110. This construction advantageously provides the desired weatherproofing for the pressure transducer 70, the gasket providing wet side isolation and the connector 80 providing dry side isolation. This construction also renders the physical contact and electrical communication between the pressure transducer 70, elastomeric connector 80, and terminal pins 60 robust to shock and vibration.

The gasket 90 includes a central opening 92 that provides fluid communication between the pressure transducer 70 and the door cavity 34 via the inlet port 210. More specifically, the opening 92 exposes a sensing portion 72 of the pressure transducer 70 to door pressure via the inlet port 210. Thus, while the pressure transducer 70 is weatherproofed by the elastomeric connector 80 and gasket 90, the pressure transducer 70 remains exposed to the pressure within the door cavity 34 and can be sensitive to changes in door pressure.

From the above description of the invention, those skilled in the art will perceive improvements, changes and modifications that do not affect the sandwiched elastomeric configuration of the gasket 90, IC 70, connector 80, and terminal pins 60, and the advantages this configuration provides, as described above. For example, the pressure sensor has been described as attaching to interior door panel via an insert/twist-to-lock arrangement. Any other attachments could be used. Additionally, the specific configurations of the plastic portions, i.e., the body 100, disc 200, and ring 300 and their assembly could also vary without departing from the spirit of the invention. Such improvements, changes and modifications within the skill of the art are intended to be covered by the appended claims.

Having described the invention, the following is claimed:

1. A pressure sensor for being mounted to a door panel in a vehicle door, comprising:
    a housing;
    a pressure transducer;
    an elastomeric connector; and
    electrical conductors for facilitating an electrical connection to the pressure sensor;
    wherein the pressure transducer is mounted in the housing adjacent the elastomeric connector, wherein the housing is configured to exert a force that presses the pressure transducer against the elastomeric connector, and wherein the elastomeric connector comprises electrically conductive regions configured to be pressed against electrical contacts of the pressure transducer and the electrical conductors to establish and maintain an electrical connection between the pressure transducer and the electrical conductors,
    wherein the housing comprises:
    a body portion comprising a sensor housing portion and an electrical connector portion;
    a disc portion comprising a disc-shaped main portion and an inlet port that extends from a first side of the main portion; and
    a base ring portion comprising an annular wall and a base wall that spans a portion of the interior space defined by the annular wall,
    wherein the sensor housing portion comprises a recess for receiving the pressure transducer sandwiched between the elastomeric connector and the gasket, wherein the disc portion is connectable to the body portion via a snap-fit connection that compresses the pressure transducer between the gasket and the elastomeric connector and places the pressure transducer in fluid communication with an exterior of the housing via an opening in the gasket and the inlet port;
    wherein the base wall includes an opening shaped and sized to receive the inlet port of the disc portion, and the annular wall includes a first extension that shields the inlet port, and a second extension that shields the electrical connector portion, wherein the base ring portion is configured to have a snap-fit connection with the disc portion to complete the assemblage of the body portion, disc portion, and base ring portion to form the pressure sensor, and
    wherein the base ring portion is configured to facilitate connecting the pressure sensor to the door panel by inserting the inlet port through an opening in the door panel and twisting the pressure sensor to lock the pressure sensor onto the door panel.

2. The pressure sensor recited in claim 1, wherein the elastomeric connector further comprises electrically insulating regions adjacent the electrically conductive regions, the electrically insulating regions helping to electrically isolate the electrical contacts of the pressure transducer and the electrical conductors from each other and from any surrounding electrically conductive structures.

3. The pressure sensor recited in claim 1, wherein the housing comprises an inlet port that provides fluid communication between an interior of the housing and an exterior of the housing, and wherein the gasket further comprises an opening that exposes the pressure transducer to air pressure external to the pressure sensor.

4. The pressure sensor recited in claim 3, wherein the housing is configured to be mounted on the door panel within the vehicle door to position the inlet port on a wet side of the door and the electrical conductors on a dry side of the door.

5. The pressure sensor recited in claim 4, wherein the pressure sensor isolates the wet side of the door from the dry side of the door.

6. The pressure sensor recited in claim 1, wherein the pressure transducer and the elastomeric connector are at least partially positioned in a recess of a sensor housing portion of the housing, the pressure transducer having an upper surface against which the gasket is positioned, an opposite lower surface against which the elastomeric connector is positioned, and a peripheral edge positioned adjacent a wall of the housing defining the recess, wherein the gasket, elastomeric connector, and sensor housing portion surround the pressure transducer on all sides with the exception of a sensing portion of the transducer that is exposed to the exterior of the sensor via an opening in the gasket.

7. The pressure sensor recited in claim 1, wherein the gasket, elastomeric connector, and sensor housing portion define a water-tight seal around the pressure transducer.

8. The pressure sensor recited in claim 1, wherein the snap-fit connection between the body portion and disc portion is facilitated by retainer tabs on the disc portion that snap onto the body portion.

9. The pressure sensor recited in claim 1, wherein the base ring further comprises retainer structures comprising ramp portions configured to retain the pressure sensor when mounted to the door panel.

10. A pressure sensor for being mounted in an opening of a door panel in an interior of a vehicle door, a wet side of the vehicle door being defined on a first side of the door panel, a dry side of the vehicle door being defined on a second side of the door panel opposite the first side, the pressure sensor comprising:
    a housing;
    a pressure transducer;
    an elastomeric connector; and
    electrical conductors for facilitating an electrical connection to the pressure sensor;
    wherein the pressure transducer is mounted in the housing adjacent the elastomeric connector, wherein the housing is configured to exert a force that presses the pressure transducer against the elastomeric connector, and wherein the elastomeric connector comprises electrically conductive regions configured to be pressed against electrical contacts of the pressure transducer and the electrical conductors to establish and maintain an electrical connection between the pressure transducer and the electrical conductors, wherein the housing comprises:

an inlet port configured to be positioned on the wet side of the vehicle door, the inlet port comprising an opening in fluid communication with the pressure transducer;

a first extension that shields the inlet port, the first extension being spaced from and spanning across the opening of the inlet port;

an electrical connector portion comprising a shroud that houses the electrical connectors and is configured to receive a corresponding male electrical connector;

a second extension that shields the electrical connector portion with the male electrical connector installed therein;

wherein the housing is configured to facilitate connecting the pressure sensor to the door panel by inserting the inlet port through an opening in the door panel to position it on the wet side of the door and twisting the pressure sensor to lock the pressure sensor onto the door panel with the electrical connector positioned on the dry side of the door.

11. The pressure sensor recited in claim 10, wherein the housing further comprises retainer structures comprising ramp portions configured to engage the door panel retain the pressure sensor when mounted to the door panel.

12. The pressure sensor recited in claim 10, wherein the elastomeric connector further comprises electrically insulating regions adjacent the electrically conductive regions, the electrically insulating regions helping to electrically isolate the electrical contacts of the pressure transducer and the electrical conductors from each other and from any surrounding electrically conductive structures.

13. The pressure sensor recited in claim 10, further comprising a gasket, wherein the pressure transducer is mounted in the housing between the gasket and the elastomeric connector, wherein the force exerted by the housing acts on the gasket and compresses the pressure transducer between the gasket and the elastomeric connector.

14. The pressure sensor recited in claim 13, wherein the housing comprises an inlet port that provides fluid communication between an interior of the housing and an exterior of the housing, and wherein the gasket further comprises an opening that exposes the pressure transducer to air pressure external to the pressure sensor.

15. The pressure sensor recited in claim 13, wherein the pressure transducer and the elastomeric connector are at least partially positioned in a recess of a sensor housing portion of the housing, the pressure transducer having an upper surface against which the gasket is positioned, an opposite lower surface against which the elastomeric connector is positioned, and a peripheral edge positioned adjacent a wall of the housing defining the recess, wherein the gasket, elastomeric connector, and sensor housing portion surround the pressure transducer on all sides with the exception of a sensing portion of the transducer that is exposed to the exterior of the sensor via an opening in the gasket.

16. The pressure sensor recited in claim 13, wherein the gasket, elastomeric connector, and sensor housing portion define a water-tight seal around the pressure transducer.

17. The pressure sensor recited in claim 13, wherein the housing comprises:

a body portion comprising a sensor housing portion and an electrical connector portion; and a disc portion comprising a disc-shaped main portion and an inlet port that extends from a first side of the main portion;

wherein the sensor housing portion comprises a recess for receiving the pressure transducer, the elastomeric connector, and the gasket, wherein the disc portion is connectable to the body portion via a snap-fit connection that places the pressure transducer in fluid communication with an exterior of the housing via an opening in the gasket and the inlet port.

18. The pressure sensor recited in claim 17, wherein the snap-fit connection between the body portion and disc portion causes the force to be exerted on the gasket.

19. The pressure sensor recited in claim 17, wherein the snap-fit connection between the body portion and disc portion is facilitated by retainer tabs on the disc portion that snap onto the body portion.

20. The pressure sensor recited in claim 17, wherein the housing further comprises a base ring portion comprising an annular wall and a base wall that spans a portion of the interior space defined by the annular wall, the base wall including an opening shaped and sized to receive the inlet port of the disc portion, a first extension that shields the inlet port, and a second extension that shields the electrical connector portion, wherein the base ring portion is configured to have a snap-fit connection with the disc portion, and wherein the base ring portion is configured to facilitate connecting the pressure sensor to the vehicle door.

* * * * *